United States Patent Office 2,714,823
Patented Aug. 9, 1955

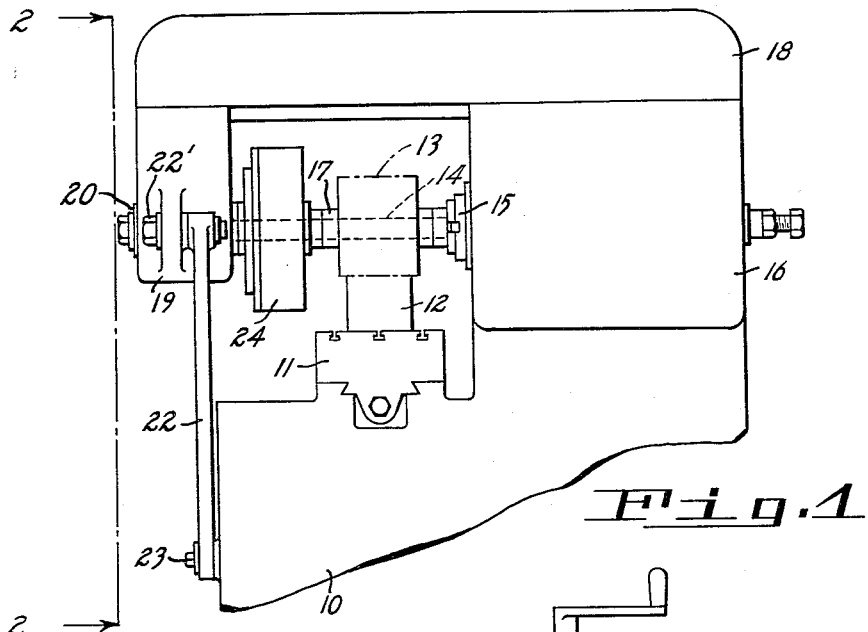
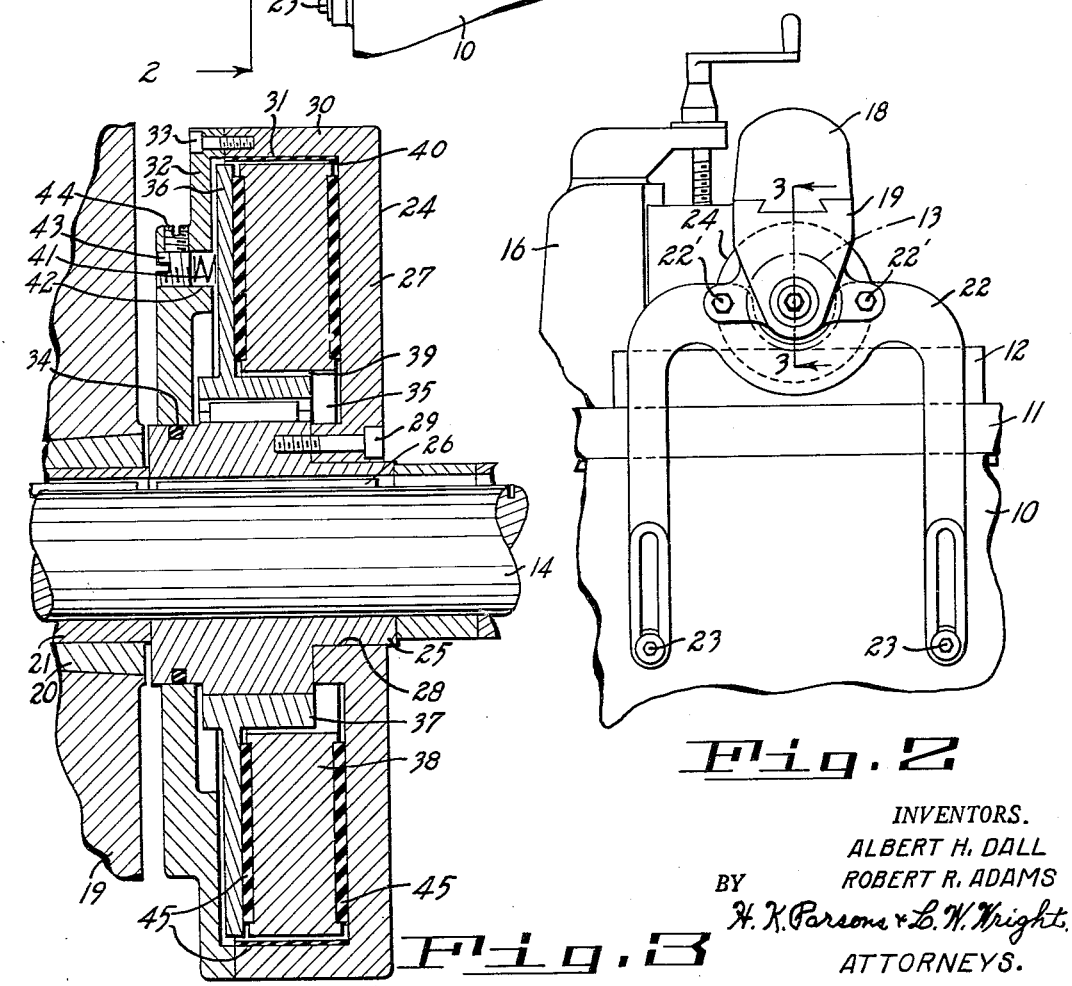

2,714,823

VIBRATION DAMPER

Albert H. Dall and Robert R. Adams, Cincinnati, Ohio, assignors to The Cincinnati Milling Machine Co., Cincinnati, Ohio, a corporation of Ohio Application October 5, 1951, Serial No. 249,844

4 Claims. (Cl. 74—574)

This invention relates to vibration dampeners for rotary tool supporting members and the like of machine tools, such as milling machines, to dampen vibrations therein when utilized to drive multi-toothed cutters which inherently have a tendency to cause vibration in their supporting member.

One of the objects of this invention is to provide a simple and improved device for damping vibrations in the tool supporting member of a machine tool during a metal removing operation.

Another object of this invention is to provide a device of the character described which is simple in construction and may be readily applied to existing machines without changes in the structure thereof.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a view in elevation showing the application of this invention to a machine tool.

Figure 2 is a view on the line 2—2 of Figure 1.

Figure 3 is a section through the vibration dampener as viewed on the line 3—3 of Figure 2.

A very important factor in the successful operation of machine tools utilizing multi-toothed cutters is the prevention of chatter or vibration in the cutter supporting mechanism during the cutting operation.

Milling machines are a good example of a machine tool in which chatter or vibration will develop easily because of the inherent construction of the machine which makes it difficult to adequately support the rotating cutter. In these machines the cutter or cutters are mounted on a horizontal arbor which overlies the work table and in order to support the free outboard end of the arbor, an overarm is utilized which has one portion attached to the fixed part of the machine and the remaining portion projecting from the machine substantially parallel to the arbor and for its full length so that an arbor support or pendant may be attached to the end of the overarm to form an outboard bearing or support for the rotating arbor.

The intermittent engagement of the cutter teeth of a circular cutter with the work as the cutter rotates creates a predetermined period of lateral vibration in this supporting structure which may be considered as an elastic system, as well as torsional vibration in the rotating arbor which drives the cutter. If the natural periods of vibration of the fixed structure of the machine are responsive to the induced vibration from the cutter, one may react on the other to amplify the vibration to the extent that as the cutting operation proceeds the vibration becomes progressively worse.

Besides the poor work finish obtained under such circumstances, and the general wear and tear on the machine, the serious economic result is that the continued chatter or pounding on the cutting edges of the tool dulls them to such an extent that the cutters have to be reground more frequently than should ordinarily be necessary. It was found in one instance that the cutter life has been increased twenty times by using this invention. This means that the time and cost of 19 cutter sharpening operations were saved.

Referring to the drawings, a milling machine has been illustrated in Figure 1 as a good example of a machine tool for the application of this invention. In this figure, the reference numeral 10 indicates the bed of the machine slidably mounted upon which is a work table 11 for feeding a work piece 12 relative to a rotary multi-toothed cutter 13. The cutter or tool is supported and keyed to an arbor 14 having one end attached to the spindle 15 which is suitably supported and journaled in the column 16 of the machine for power rotation by a conventional driving mechanism not shown.

Spacers, such as 17, are mounted on the arbor for suitably locating the cutter axially of the arbor and relative to the work surface to be machined. To steady the outboard end of the arbor the column is provided with an overarm 18 which overhangs the work supporting structure and is provided with a pendant 19 which has a bushing 20 forming a bearing for a bearing sleeve 21 keyed to the end of the arbor 14 as shown in Figure 3.

As shown in Figure 2, a conventional harness structure 22 is attached to the pendant as by clamping bolts 22', and also attached to the bed, as by clamping bolts 23.

The vibration dampener is shown in section in Figure 3 and comprises a closed cylindrical housing indicated generally by reference numeral 24 in Figure 1, providing an annular chamber therein. Although there are many ways of constructing a closed housing, a very good construction for the purposes herein is shown in Figure 3 and comprises a hub member 25 adopted to be keyed to the rotating shaft at 26 to receive a driving force therefrom. A first side wall member 27 is fitted on a shoulder 28 of the hub member and fastened thereto by bolts 29. This wall member has an integral flange 30 at right angles to its face forming a peripheral cylindrical wall 31. A second side wall member 32 is fitted on the other end of the hub member 25 and in abutting relation to the end face of the peripheral wall and fastened thereto by bolts 33. An O-ring seal 34 is provided between members 32 and 25 whereby it will be seen that a substantially watertight chamber is provided, thus insuring against leakage of coolant used in the machine from entering the chamber 35.

Within the hollow chamber there is provided a flat disk 36 having a hub portion 37 which is splined on the main hub portion 25 for movement parallel to the axis of rotation of arbor 14, or, in other words, the disk is laterally movable. Between the disk and the side wall 27 there is provided a heavy lead weight or inertia member 38 which has radial clearance at 39 between its bore and the hub member 37, but, more important, its periphery has a slight clearance at 40 with respect to the interior cylindrical wall 31 of the chamber. There is also lateral clearance, but this clearance is taken up by the disk 36 which is pressed against the side of the inertia member. This pressure is developed by springs 41 which are inserted in bores 42 in the side wall 32, and the end of the bores are closed by headless adjusting screws 43 which can be tightened to adjust the pressure of the springs. The screws are locked by set screws 44 threaded in at right angles. To develop the necessary friction the interior walls of the chamber and the face of the disk are lined with a layer of non-metallic friction material 45. In this instance, corprene forms a good material for the purpose.

It will now be seen that the weight is held by friction between the opposing faces of the wall 27 and the disk 36 and is subject to relative rotary movement as well as relative radial movement with respect to the axis of rotation of the cutter supporting arbor 14. Therefore, a radial vibrational impulse imparted to the arbor will be opposed by the reaction created in the housing in attempting to move the weight through the frictional connection. The frictional connection produces a time lag in starting the radial movement of the weight.

By the time that the weight is under way moving in one direction, the vibrational impulse has changed direction so that it is acting in a direction opposite to the direction of movement of the weight, whereby the momentum of the weight opposes the vibrational impulse and damps its amplitude.

The same action and reaction occurs with torsional vibration in that one phase of the vibration phenomena causing the weight to accelerate with respect to the housing, but the delay in acceleration is sufficient to cause the momentum of the weight to oppose the other phase of the vibration.

The vibration dampening unit may be readily applied to and removed from the arbor as a unit in the same way that the cutters are changed by removing the pendant 19 from the end of the overarm and dropping the harness 22. The unit may then be slid on and off of the arbor.

There has thus been provided an improved vibration dampener for milling machines and the like which may be readily applied to the tool driving arbor of such a machine and which is very simple in construction and which may be adjusted in accordance with the frequency of vibration in the arbor to oppose and damp vibrations generated therein.

What is claimed is:

1. A vibration dampening mechanism for a rotatable member subject to lateral torsional vibration comprising a cylindrical housing having a central hub portion, spaced side walls and a cylindrical wall circumscribing said side walls forming a closed chamber, means for connecting said hub portion to said rotatable member for rotation therewith and response to lateral and torsional vibration thereof, a disc mounted within said chamber having a hub slidably splined on said central hub portion for rotation therewith but axial movement relative thereto, an annular weight having flat side walls mounted within said chamber between said disc and one side wall and surrounding the hub of said disc with lost motion clearance, resilient means acting on said disc to squeeze the weight against the side wall of said chamber to develop a frictional force against both sides of said weight to retard floating of said weight within said chamber both radially and circumferentially and thereby dampen lateral or torsional vibration during rotation of said rotatable member.

2. A vibration dampening mechanism for a rotatable member subject to lateral and torsional vibration comprising a cylindrical housing having a central hub portion, spaced side walls and a cylindrical wall circumscribing said side walls forming a closed chamber, means for connecting said hub portion to said rotatable member for rotation therewith and response to lateral and torsional vibration thereof, a disc mounted within said chamber having a hub slidably splined on said central hub portion for rotation therewith but axial movement relative thereto, an annular weight having flat side walls mounted between said disc and one of said side walls, said weight being of less diameter than said cylindrical wall and having a central bore providing lost motion clearance with the hub of said disc, resilient means acting on said disc to squeeze the weight against the wall of said chamber to develop a frictional force against both sides of said weight to retard floating thereof both radially and circumferentially to dissipate energy and thereby dampen lateral or torsional vibration during rotation of said rotatable member.

3. A vibration dampening mechanism for a rotatable member subject to lateral and torsional vibration comprising a cylindrical housing having a central hub portion, spaced side walls and a cylindrical wall circumscribing said side walls forming a closed chamber, means for connecting said hub portion to said rotatable member for rotation therewith and response to lateral and torsional vibration thereof, a disc mounted in said chamber having a hub slidably splined on said central hub portion for rotation therewith but axial movement relative thereto, an annular weight having flat side walls mounted between said disc and one of said side walls and surrounding the hub of said disc with lost motion clearance, non-metallic frictional means lining the weight abutting surfaces of the chamber and disc, resilient means acting on said disc to squeeze the weight between the disc and chamber wall to develop a frictional force against both sides of said weight to retard floating thereof within said chamber both radially and circumferentially to dissipate energy and thereby dampen lateral or torsional vibration of said rotatable member during rotation thereof.

4. A vibration dampening mechanism for a rotatable member subject to lateral and torsional vibration comprising a cylindrical housing having a central hub portion, spaced side walls and a cylindrical wall circumscribing said side walls forming a closed chamber, means for connecting said hub portion to said rotatable member for rotation therewith and response to lateral and torsional vibration thereof, a disc within said chamber having a hub slidably splined on said central hub portion for rotation therewith but axial movement relative thereto, an annular weight having flat side walls and of less diameter than said cylindrical wall mounted within said chamber, said weight having a bore surrounding the hub of said disc with lost motion clearance, non-metallic frictional means lining the weight abutting surfaces of the chamber and disc, resilient means acting on said disc to squeeze the weight against the side wall of said chamber to develop a frictional force against both sides of said weight to retard floating thereof within said chamber and thereby dissipation of energy to dampen lateral or torsional vibration of said rotatable member during rotation thereof, said resilient means including springs mounted in one of said side walls and engaging said disc, and means exterior of said housing for adjusting said springs.

References Cited in the file of this patent

UNITED STATES PATENTS

| | | |
|---|---|---|
| 1,442,092 | Parsons et al. | Jan. 16, 1923 |
| 1,838,023 | Manville | Dec. 22, 1931 |
| 1,928,119 | Vargha | Sept. 26, 1933 |
| 1,949,520 | Whisler | Mar. 6, 1934 |
| 1,965,224 | Ernst et al. | July 3, 1934 |
| 2,159,235 | Tyler | May 23, 1934 |
| 2,198,135 | Strasburg | Apr. 23, 1940 |
| 2,198,403 | Canady | Apr. 23, 1940 |
| 2,411,550 | Lynn et al. | Nov. 26, 1946 |
| 2,557,511 | Oles | June 19, 1951 |